United States Patent
Swanepoel et al.

(10) Patent No.: US 6,799,348 B1
(45) Date of Patent: Oct. 5, 2004

(54) WINDSCREEN WIPER

(75) Inventors: Adriaan Retief Swanepoel, Pretoria (ZA); Johannes Hendrik Fehrsen, Johannesburg (ZA)

(73) Assignee: TRICO Products Corporation, Rochester Hills, MI (US)

( * ) Notice: Subject to any disclaimer, the term of this patent is extended or adjusted under 35 U.S.C. 154(b) by 0 days.

(21) Appl. No.: 09/806,921

(22) PCT Filed: Sep. 23, 1999

(86) PCT No.: PCT/IB99/01573
§ 371 (c)(1),
(2), (4) Date: Jun. 25, 2001

(87) PCT Pub. No.: WO00/21811
PCT Pub. Date: Apr. 20, 2000

(30) Foreign Application Priority Data

Oct. 12, 1998 (ZA) .............................. 98/9282

(51) Int. Cl.⁷ ................................................ B60S 1/40
(52) U.S. Cl. .................................. 15/250.32; 15/250.43
(58) Field of Search ......................... 15/250.43, 250.32, 15/250.44, 250.451, 250.452, 250.301, 250.351, 250.361

(56) References Cited

U.S. PATENT DOCUMENTS

| | | | |
|---|---|---|---|
| 2,589,339 A | 3/1952 | Carson | 15/245 |
| 2,801,436 A | 8/1957 | Scinta | 15/245 |
| 3,029,460 A | 4/1962 | Hoyler | |
| 3,104,412 A | 9/1963 | Hinder | 15/250.42 |
| 3,132,367 A | 5/1964 | Wise | 15/250.42 |
| 3,192,551 A | 7/1965 | Appel | 15/250.36 |
| 3,480,986 A | 12/1969 | Forster | 15/250.36 |
| 3,588,942 A | 6/1971 | Schlesinger | 15/250.32 |
| 3,751,754 A | 8/1973 | Quinian et al. | 15/250.32 |
| 3,780,395 A | 12/1973 | Quinian et al. | 15/250.36 |
| 3,785,002 A | 1/1974 | Quinlan et al. | 15/250.36 |
| 3,872,537 A | 3/1975 | Bianchi | 15/250.42 |
| 3,881,214 A | 5/1975 | Palu | 15/250.42 |
| 4,028,770 A | 6/1977 | Appel | 15/250.42 |
| 4,063,328 A | 12/1977 | Arman | 15/250.42 |
| 4,102,003 A | 7/1978 | Hancu | 15/250.42 |
| 4,127,916 A | 12/1978 | van den Berg et al. | 15/250.42 |
| 4,339,839 A | 7/1982 | Knights | 15/250.04 |
| 4,343,063 A | 8/1982 | Batt | 15/250.42 |
| 4,587,686 A | 5/1986 | Thompson | 15/250.42 |
| 4,807,326 A | 2/1989 | Arai et al. | 15/250.42 |
| 5,319,826 A * | 6/1994 | Mower | 15/250.44 |
| 5,325,564 A | 7/1994 | Swanepoel | 15/250.42 |
| 5,485,650 A | 1/1996 | Swanepoel | 15/250.43 |

FOREIGN PATENT DOCUMENTS

| | | | | |
|---|---|---|---|---|
| DE | 2 311 293 | 9/1974 | | |
| DE | 23 36 271 | 2/1975 | | |
| DE | 23 50 302 | 4/1975 | | |
| DE | 23 53 368 | 5/1975 | | |
| DE | 197 34 843 A1 | 2/1999 | | |
| DE | 198 14 609 A1 | 10/1999 | | |
| FR | 82 14233 | 8/1982 | | |
| GB | 1 012 902 | 12/1965 | | |
| GB | 1 395 918 | 5/1975 | | |
| GB | 2 308 542 A | 7/1997 | | |
| WO | WO 9815438 A1 * | 4/1998 | | B60S/1/38 |
| WO | WO 9819899 A1 * | 5/1998 | | B60S/1/38 |

* cited by examiner

Primary Examiner—Terrence R. Till
Assistant Examiner—Shay L Balsis
(74) Attorney, Agent, or Firm—Bliss McGlynn, P.C.

(57) ABSTRACT

A windscreen wiper (14) assembly includes a wiper arm (12) and a windscreen wiper having a resiliently flexible elongate beam (18) which is curved in a plane. The assembly also includes a coupler (16) for coupling an end of the wiper arm (12) to the wiper (4) in such a manner that resilient bending movement of the beam in the plane of curvature along its full length is substantially allowed. The invention also relates to a coupler for a windscreen wiper assembly.

13 Claims, 5 Drawing Sheets

WINDSCREEN WIPER

BACKGROUND OF THE INVENTION

1. Field of Invention

This Invention relates to a windscreen wiper. More particularly, the invention relates to a windscreen wiper assembly and to a coupler for a windscreen wiper assembly.

2. Description of the Related Art

WO-A-98/19 899 discloses a windscreen wiper assembly having a wiper arm, a windscreen wiper with a resiliently flexible elongate beam which is curved in a plane, and a coupler for coupling an end of the wiper arm to the wiper. However, with this prior art assembly the beam is tightly gripped and flexing movement of the beam in the coupler is inhibited. This impairs operation of the wiper.

Thus, according to the invention there is provided a coupler for coupling an end of a wiper arm to a windscreen wiper having a resiliently flexible elongate beam which is curved in a plane, comprising
  a support structure; and
  a mounting means for mounting the support structure to the beam;
  characterized therein that the coupler has at least one spacing formation carried by the support structure, engageable in use with an upper surface of the beam, for spacing the upper surface of the beam a predetermined distance from the support structure, thereby to provide a space in which the beam can flex, in use.

The invention extends to a windscreen wiper assembly which includes a windscreen wiper having a resiliently flexible elongate beam which is curved in a plane and a coupler in accordance with the invention engaged therewith.

At least one spacing formation may comprise a fulcrum formation which permits, in use, bending movement of the beam about the formation in the plane of curvature.

Preferably there may be a pair of spaced spacing formations.

The support structure may have an elongate, substantially planar base with the spacing formations being defined on a bottom surface of the base. Each spacing formation may comprise an elongate protrusion located transversely to the base end, in use, transversely to the plane of curvature of the beam. Each protrusion may have a rounded or sharpened edge to allow bending of the beam thereabout.

The mounting means may comprise two pairs of spaced apart claws which extend from the base. Each of the spacing formations may be proximate or aligned with one of the pairs of claws.

The spacing between the upper surface of the beam and the bottom surface of the support structure may be sufficient to permit flexing, in use, of the beam.

The spacing between the claws of each pair may be substantially equal to the width of the beam at that position in order to inhibit pivoting or twisting of the beam about its longitudinal axis and to impede relative lateral movement.

The beam may have a securing formation complementary to one of the pairs of claws for securing the support structure to the beam so that longitudinal movement of the beam relative to the coupler at that point is impeded. Those skilled in the art will appreciate that relative longitudinal movement will be permitted between the beam and the support structure at the pair of claws spaced from the securing formation.

The coupler may thus be mounted to the wiper such that longitudinal movement of the beam relative to a point on the coupler, rotation of the beam about its longitudinal axis and rotation of the longitudinal axis of the beam relative to the longitudinal axis of the arm (known as fish talling) are substantially inhibited.

The assembly may also include a connecting structure for pivotally connecting the end of the wiper arm to the wiper to allow pivotal movement of the wiper arm relative to the wiper in the plane of curvature. It will be appreciated that the connecting structure may form a part of the coupler or of the arm or a combination of both.

It will be appreciated that the wiper performs better with a coupler in accordance with the invention as the beam is able to flex about the spacing formations inside the coupler.

It will also be appreciated that the windscreen wiper assembly as described above significantly reduces the height required between a windscreen and a vehicle bonnet in order to improve wind flow over the vehicle and allow the windscreen wiper assembly and arm to be hidden below the vehicle bonnet.

It will be appreciated further that the invention has specific application to a low profile wiper and that the coupler is designed to minimise distance or space between the bottom surface of the support structure and the upper surface of the beam whilst still providing sufficient space for the beam to flex. It will also be appreciated that the distance or space is dependent on the distance between the spacing formations and will accordingly be larger when the spacing formations are further apart to allow for bending movement of the wiper between the points of contact. A height dimension from a bottom edge of a rubber which is mounted to the beam of the wiper and the highest protrusion of the coupler may be less than 25 mm and preferably is less than 20 mm.

BRIEF DESCRIPTION OF THE DRAWINGS

The invention now described, with reference to the accompanying drawings, in which.

BRIEF DESCRIPTION OF THE PREFERRED EMBODIMENTS

Figure 1:
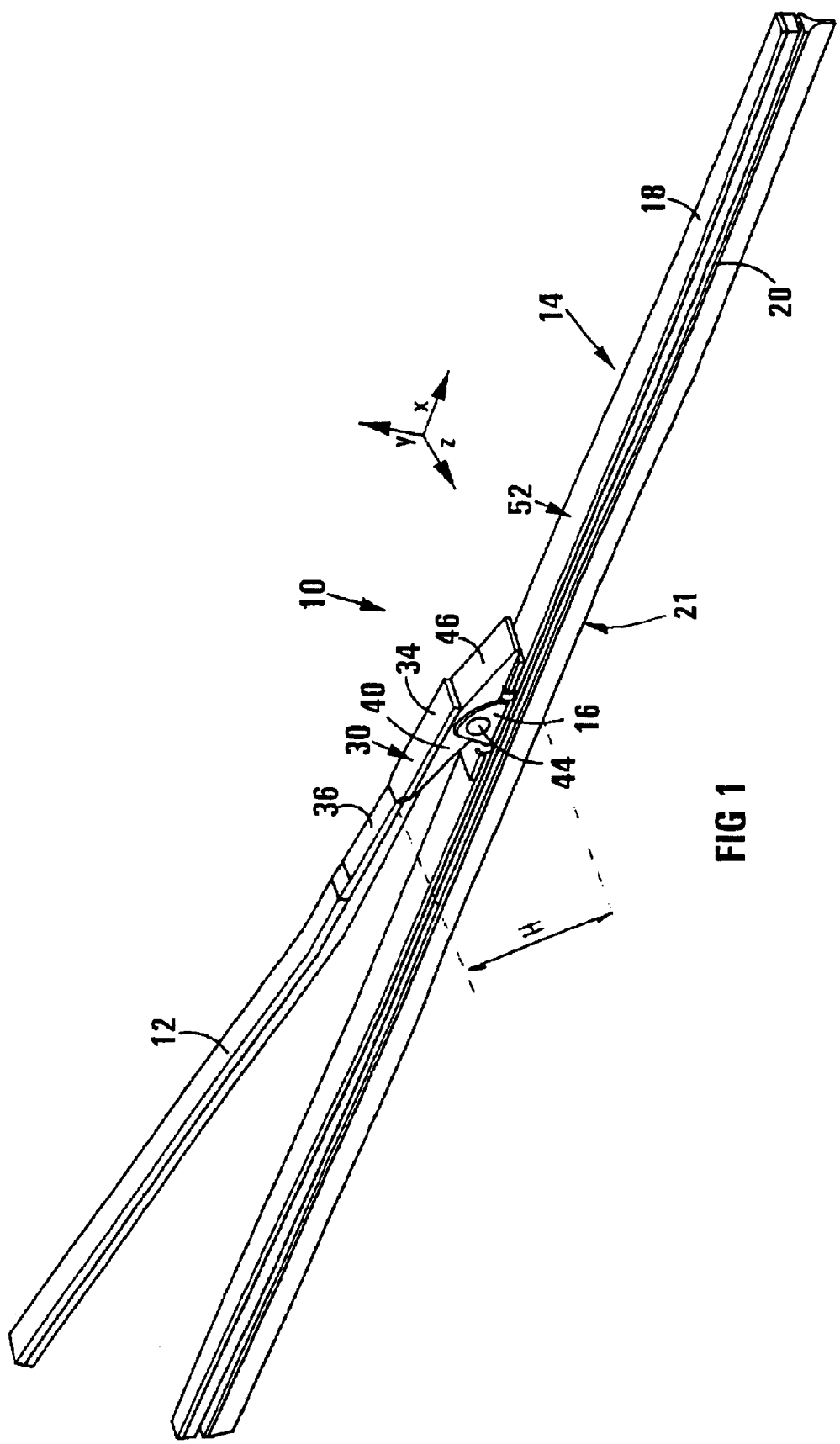
FIG. 1 shows a schematic isometric view of a windscreen wiper assembly, in accordance with the invention, with the wiper shown in a straightened condition.

In the drawings, a windscreen wiper assembly, in accordance with the invention, is generally designated by the reference numeral 10.

The assembly 10 includes a wiper arm 12, a windscreen wiper 14 and a coupler 16, generally indicated by reference numeral 16, for coupling an end of the wiper arm 12 to the wiper 14. The wiper 14 includes a resiliently flexible elongate beam 18 which is curved in a plane perpendicular to axis Z (as shown in FIG. 1). A rubber wiping strip 20 is mounted to the beam 18.

Figure 6:
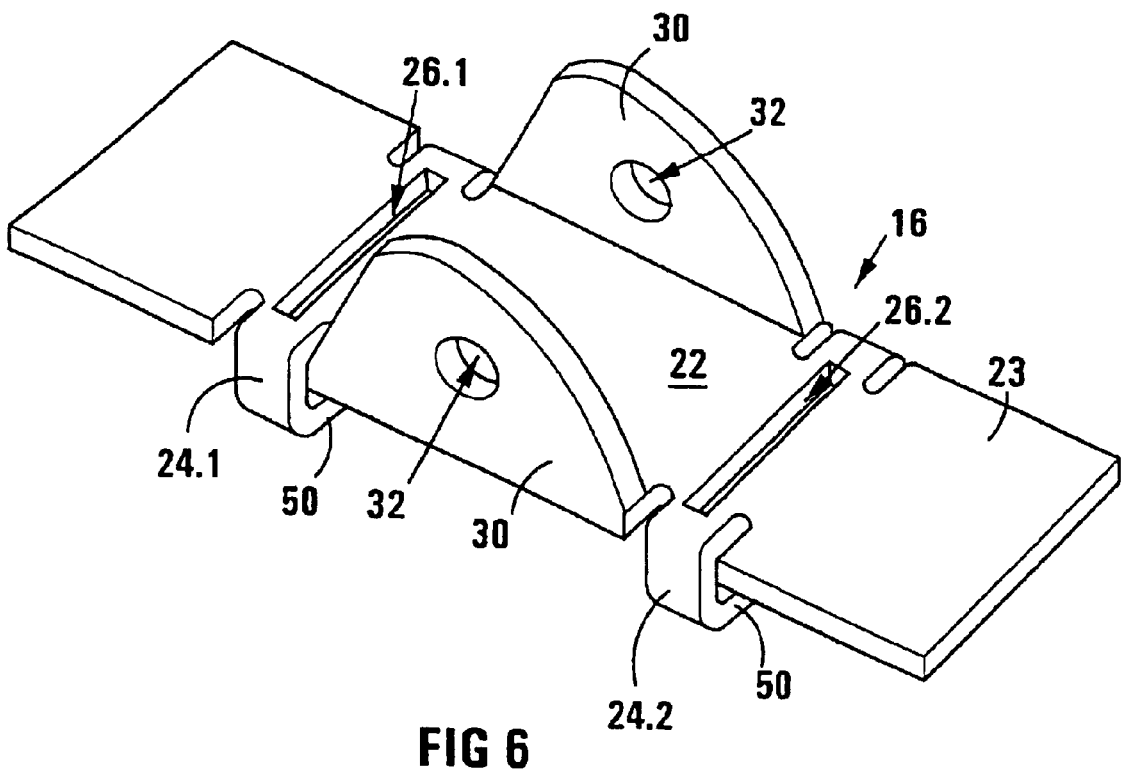
FIG. 6 shows a schematic isometric view of a coupler for a windscreen wiper assembly, in accordance with another aspect of the invention.
Figure 7:
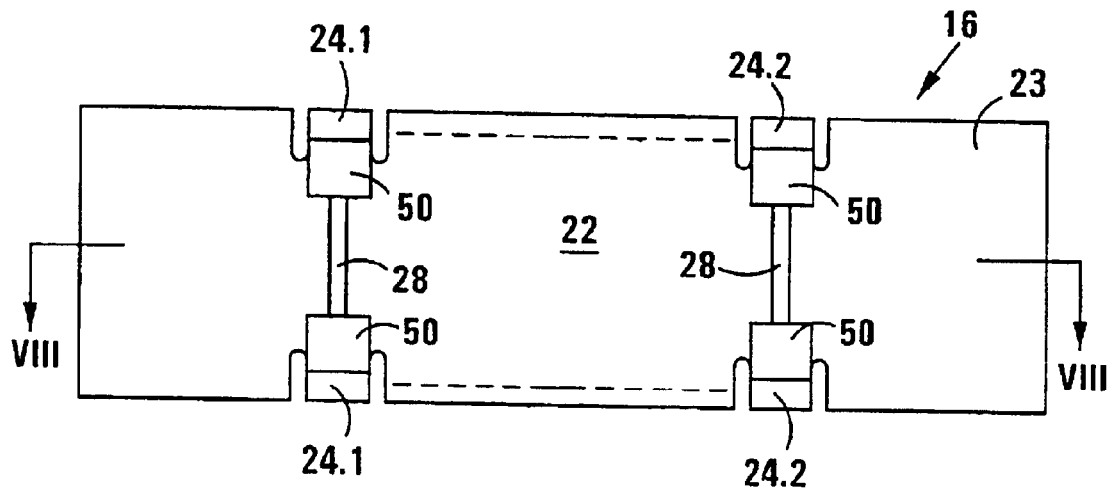
FIG. 7 shows a bottom view of the coupler of FIG. 6.
Figure 8:
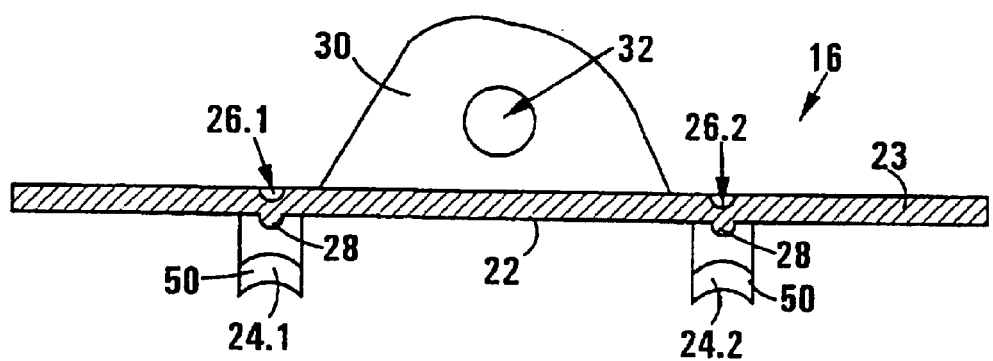
FIG. 8 shows a sectional side elevation of the coupler of FIG. 7 taken along the line VIII—VIII in FIG. 7.

Referring specifically to FIGS. 6 to 8, the coupler 16 comprises a support structure 23, having an elongate, substantially rectangular, planar base 22. A height dimension H between a bottom edge 21 of the rubber 20 and highest protrusion of the coupler 16, is preferably less than 25 mm. A mounting means in the form of two pairs of spaced apart claws 24.1 and 24.2 extend from the base 22 of the support structure 23. A pair of fulcrum formations in the form of elongate impressions 26.1 and 26.2 are located transversely to the base 22, each aligned with a corresponding pair of claws 24.1 and 24.2. Each impression 26.1 and 26.2 has a rounded bottom edge 28 as can be seen in FIGS. 7 and 8. The coupler 16 may be formed of a rigid synthetic plastics material or steel.

A pair of support sides 30 extend substantially transversely to the base 22 of the support structure 23, with a pair of aligned openings 32 defined in the support sides 30.

Figure 2:
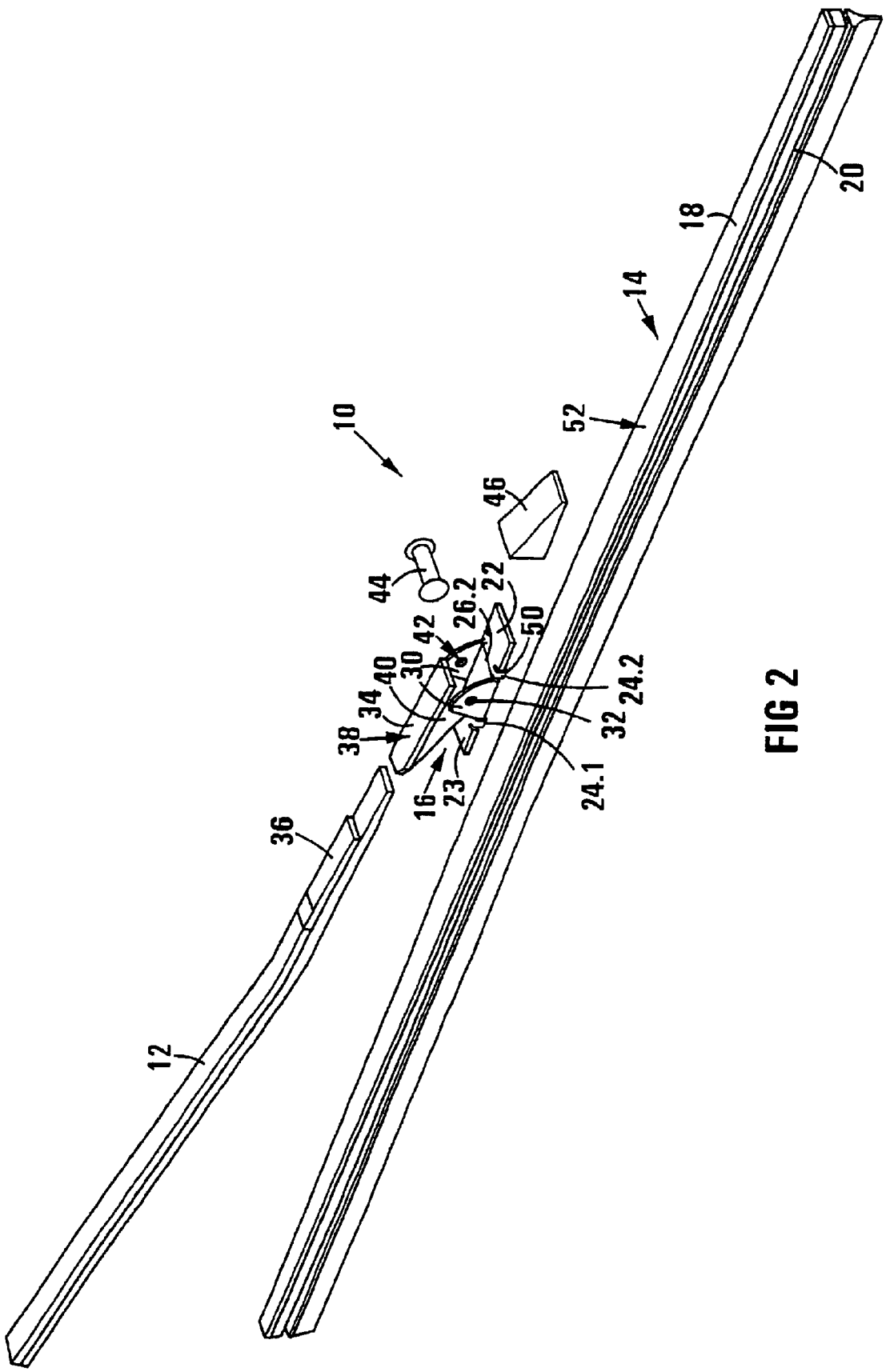
FIG. 2 shows a partially exploded view of the assembly of FIG. 1.
Figure 3:
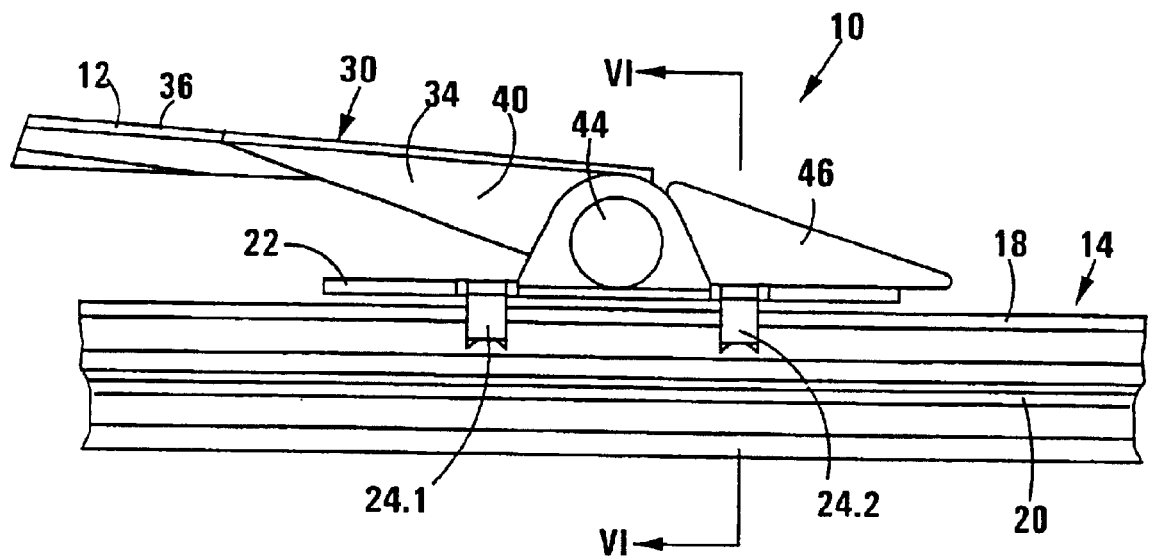
FIG. 3 shows an enlarged view of part of the assembly of FIG. 1.

Referring to FIGS. 1 to 3, the assembly 10 also includes a connecting structure 34 for pivotally connecting an end 36 of the wiper arm 12 to the wiper 14. The connecting structure 34 includes a substantially planar upper surface 38, with two substantially parallel sides 40 depending downwardly from the surface 38. The sides 40 are spaced a predetermined distance apart so that they fit snugly between the support sides 30 of the coupler 16, so as to prevent lateral movement and rotational movement about the Y axis between the longitudinal axis of the arm 12 and the beam 18. An aperture 42 is defined in each side 40, the apertures 42 being aligned to the openings 32 for receiving a transverse pivot pin 44 for pivotally connecting the coupler 16 to the wiper arm 12.

The assembly also includes a nose piece 46 which covers part of the coupler 16 and connecting structure 34.

Figure 5:
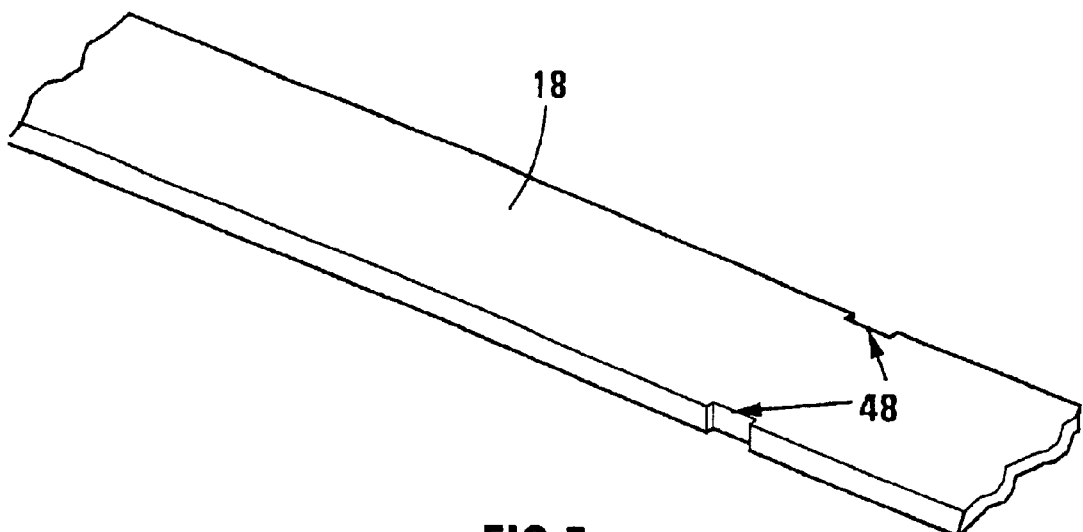
FIG. 5 shows a detailed view of part of a windscreen wiper which forms part of the assembly shown FIG. 1.

The beam 18 is provided with a pair of indents 48 (FIG. 5), which is complementary to one of the pairs of claws 24, for securing the coupler 16 to the beam 18 at that point so that longitudinal movement of the beam 18 relative to the coupler 16 is inhibited at that point.

Figure 4:
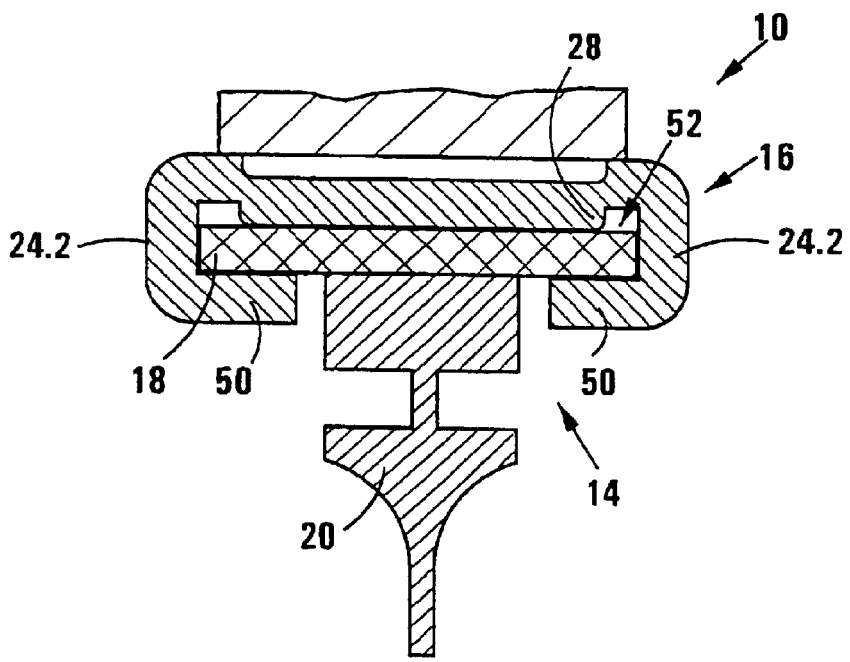
FIG. 4 shows a sectional end elevation of the assembly of FIG. 3 taken along the line IV—IV in FIG. 3.

In use, the connecting structure 34 is attached to the end 36 of the arm 12. The connecting structure 34 and the coupler 16 are connected to each other by means of the pivot pin 44. The coupler 16 is positioned on the beam 18 so that one of the pairs of claws 24.1 is aligned with the indents 48 on the beam 18, and distal ends 50 of the claws 24 are folded over the beam 18, so that the rounded ends 28 of the fulcrum formations abut an upper surface 52 of the beam 18 as is shown in FIG. 4.

The pair of claws 24.1 which is aligned with the indents 48, secures the beam 18 in position at that point so that longitudinal movement of the wiper 14 relative to the coupler 16 is restrained. The other pair of claws 24.2 are folded over edges of the beam 18 but allows longitudinal movement of the wiper 14 relative to the coupler 16 at that point.

In use, movement of the wiper assembly 10 relative to a windscreen causes the wiper 14 to move in the plane of curvature as it straightens and bends to accommodate various curvatures of the windscreen. Movement of the beam 14 in the plane of curvature is allowed by the fulcrum formations.

The applicant believes that the advantages of the wiper assembly 10 as described with reference to the drawings, are that it allows substantially unrestrained movement of the wiper 14 in its plane of curvature and provides a low profile coupler 16 with its associated advantages. It will be appreciated that unrestrained beam bending movement is conducive to optimal force distribution performance. The wiper assembly also significantly reduces the height required between the windscreen and the vehicle bonnet, thereby improving wind flow over the vehicle and allow the windscreen wiper assembly and arm to be hidden below the vehicle bonnet.

What is claimed is:

1. A coupler (16) for coupling an end of a wiper arm (12) to a windscreen wiper (14) having a resiliently flexible elongate beam (18) which is curved in a plane, comprising
    a support structure (23); and
    a plurality of claws (24.1, 24.2) for mounting the support structure to the beam;
    characterized therein that the coupler has at least one spacing formation (26.1, 26.2) carried by the support structure, engageable in use with an upper surface of the beam at a contact point, for spacing the contact point of the beam a predetermined distance from the support structure.

2. The coupler as claimed in claim 1, characterized therein that at least one spacing formation comprises a fulcrum formation which permits, in use, bending movement of the beam about the formation in the plane of curvature.

3. The coupler as claimed in claim 2, characterized therein that there are a pair of spaced formations.

4. The coupler as claimed in claim 1, characterized therein that there are a pair of spaced spacing formations.

5. The coupler as claimed in claim 4, characterized therein that the support structure has an elongate, substantially planar base (22), with the spacing formations being defined on a bottom surface of the base.

6. The coupler as claimed in claim 5, characterized therein that each spacing formation comprises an elongate protrusion located transversely to the base and, in use, transversely to the plane of curvature of the beam.

7. The coupler as claimed in claim 5, comprising two pairs of said claws (24.1, 24.2) spaced apart and extending from the base.

8. The coupler as claimed in claim 7, characterized therein that each of the spacing formations is aligned with one of the pairs of claws.

9. The coupler as claimed in claim 1, characterized therein that it has a connecting structure (34) for pivotal connection to the wiper arm.

10. A windscreen wiper assembly (10) which includes a windscreen wiper (14) having a resiliently flexible elongate beam (18) which is curved in a plane and a coupler (16) for coupling the windscreen wiper (14) to a wiper arm (12), said assembly comprising:
    a support structure (23);
    a plurality of claws (24.1, 24.2) for mounting the support structure to the beam; and
    at least one spacing formation (26.1, 26.2) carried by the support structure, engageable in use with an upper surface of the beam at a contact point, for spacing the contact point of the beam a predetermined distance from the support structure.

11. The windscreen wiper assembly as claimed in claim 10, characterized therein that the spacing between the contact point of the beam and the support structure is sufficient to permit flexing, in use, of the beam.

12. The windscreen wiper assembly as claimed in claim 10, in which the support structure of the coupler has an elongate, substantially planar base (22), with the spacing formations being defined on a bottom surface of the base and two pairs of said claws (24.1, 24.2), spaced apart and extending from the base, and characterized therein that the spacing between the claws of each pair is substantially equal to the width of the beam at that position.

13. The windscreen wiper assembly as claimed in claim 10, characterized therein that the beam has a securing formation (48) for securing the support structure to the beam in a manner to inhibit longitudinal movement of the beam relative to the coupler at that position.

* * * * *